(12) United States Patent
Boyle et al.

(10) Patent No.: US 10,391,551 B2
(45) Date of Patent: Aug. 27, 2019

(54) MOLD BODY WITH INTEGRATED CHILL

(71) Applicant: FISHER CONTROLS INTERNATIONAL LLC, Marshalltown, IA (US)

(72) Inventors: Adam Taylor Boyle, Bukit Timah (SG); Nathan Padriac VanBecelaere, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 168 days.

(21) Appl. No.: 15/425,055

(22) Filed: Feb. 6, 2017

(65) Prior Publication Data

US 2018/0221942 A1   Aug. 9, 2018

(51) Int. Cl.
| | | |
|---|---|---|
| B22D 15/04 | (2006.01) | |
| B33Y 80/00 | (2015.01) | |
| B22C 9/02 | (2006.01) | |
| B22D 15/00 | (2006.01) | |
| B28B 1/00 | (2006.01) | |
| B28B 7/34 | (2006.01) | |
| B33Y 10/00 | (2015.01) | |

(52) U.S. Cl.
CPC ............... *B22D 15/04* (2013.01); *B22C 9/02* (2013.01); *B22D 15/00* (2013.01); *B28B 1/001* (2013.01); *B28B 7/34* (2013.01); *B28B 7/342* (2013.01); *B28B 7/346* (2013.01); *B33Y 10/00* (2014.12); *B33Y 80/00* (2014.12)

(58) Field of Classification Search
CPC .......... B22D 15/00; B22D 15/04; B22C 9/02; B22C 9/065; B22C 9/067; B22C 9/068
See application file for complete search history.

(56) References Cited

U.S. PATENT DOCUMENTS

| | | | | |
|---|---|---|---|---|
| 8,651,167 B1 * | 2/2014 | Hasenbusch | ......... | B22D 15/005 164/122.1 |
| 2012/0000877 A1 * | 1/2012 | Smith | ....................... | B22C 9/02 213/155 |
| 2013/0160961 A1 * | 6/2013 | Smerecky | ................. | B22C 9/02 164/23 |

FOREIGN PATENT DOCUMENTS

| | | |
|---|---|---|
| EP | 2465623 A1 | 6/2012 |
| EP | 2716390 A2 | 4/2014 |
| JP | 2016117067 A | 6/2016 |

OTHER PUBLICATIONS

English Machine Translation of Yoichi JP2016117067 (Year: 2016).*
International Search Report for PCT/US2018/014444 dated Apr. 24, 2018.
Written Opinion for PCT/US2018/014444 dated Apr. 24, 2018.
Kotzin, "Venting . . . A Lost Art" dated Mar. 1998, 3 pgs.

* cited by examiner

*Primary Examiner* — Kevin P Kerns
*Assistant Examiner* — Steven S Ha
(74) *Attorney, Agent, or Firm* — Marshall, Gerstein & Borun LLP

(57) ABSTRACT

A mold body for use in a mold includes a mold cavity, a chill cavity, a fill channel, and a chill material having a thermal conductivity that is greater than the thermal conductivity of the mold body disposed within the chill cavity. The chill cavity is formed adjacent the mold cavity and is separated from the mold cavity by a chill wall. The fill channel is in communication with the chill cavity and with an exterior surface of the mold body.

18 Claims, 3 Drawing Sheets

MOLD BODY WITH INTEGRATED CHILL

FIELD OF THE DISCLOSURE

The present disclosure is directed generally to molds and, more particularly, to mold bodies with integrated chills.

BACKGROUND

Foundries use molds, such as sand molds, investment molds, etc., to produce metal and other material castings having a great variety of sizes, shapes, and complexities. Some castings, such as those for valve bodies, have very unique shapes that require a high level of quality to be maintained. To better control the casting process and maintain a high level of quality, chills can be utilized in the molds to more rapidly cool molten metal, which is commonly done to minimize or eliminate shrink defects in all types of metal castings. A typical chill is a piece of metal, or other acceptable material, that is incorporated into a mold body at the edge of the molding cavity and forms a part of the molding cavity in the area where accelerated cooling of the casting is desired. The chill is incorporated into the mold body when the mold body is produced.

However, various issues arise in an attempt to incorporate typical chills in mold bodies created using 3D printing, such as 3D sand printing. In 3D sand printing, a 3-dimensional design of the entire mold or of a particular mold body is produced and divided into multiple layers. A thin layer of sand, such as silica sand, which could be mixed with a suitable activator, is then laid down representing the first layer of the design. A binder is the applied to the areas required to form the solid structure for that particular layer. A second thin layer of sand, representing the second layer of the design, is then laid down over the first layer and the binder is applied to the areas required to form the solid structure for that particular layer. This continues layer after layer to form the completed mold or mold body design.

Using this 3D sand printing process, the mold body can no longer be produced around a typical chill, as placement of the chill would impede the machinery used in the 3D sand printing process. Thus, instead of producing the mold body around the chill, the chill has to be produced outside of the mold body to a near net shape, a cavity has to be formed in the mold body to receive the chill, and the chill has to be inserted into the existing 3D sand printed mold. However, various issues arise such as maintaining the dimensional tolerances of the chill and the cavity formed in the mold body required for the chill to properly fit in the 3D sand printed mold body and to properly align the chill with the desired surface of the casting. In addition, it can be difficult to place and secure the chill within the cavity so that the chill does not move or become dislodged during the casting process.

BRIEF SUMMARY OF THE DISCLOSURE

In accordance with one exemplary aspect of the present invention, a mold body for use in a mold includes a mold cavity, a chill cavity, a fill channel, and a chill material having a thermal conductivity that is greater than the thermal conductivity of the mold body disposed within the chill cavity. The chill cavity is formed adjacent the mold cavity and is separated from the mold cavity by a chill wall. The fill channel is in communication with the chill cavity and with an exterior surface of the mold body.

In further accordance with any one or more of the foregoing exemplary aspects of the present invention, the mold body may further include, in any combination, any one or more of the following preferred forms.

In one preferred form, the mold body is one of a sand mold body and a 3D printed sand mold body.

In another preferred form, the chill material is one of metallic beads, zircon sand, chromite sand, ceramic beads, or olivine sand.

In another preferred form, the mold body includes a second chill cavity, a second fill channel, and a second chill material. The second chill cavity is formed adjacent the mold cavity, is spaced apart from the chill cavity, and is separated from the mold cavity by a second chill wall. The second fill channel is in communication with the second chill cavity and with the exterior surface of the mold body. The second chill material is disposed within the second chill cavity and has a thermal conductivity that is greater than the thermal conductivity of the mold body.

In another preferred form, the second chill material is one of metallic beads, zircon sand, chromite sand, ceramic beads, or olivine sand.

In another preferred form, the second chill material is different than the chill material.

In another preferred form, the mold body includes a vent channel having a first end in communication with the chill cavity and a second end in communication with an exterior surface of the mold to vent the chill cavity to the atmosphere.

In accordance with another exemplary aspect of the present invention, a method of producing a mold body for use in a mold, comprising the steps of: forming a mold cavity; forming a chill cavity adjacent the mold cavity and separated from the mold cavity by a chill wall; forming a fill channel in communication with the chill cavity and with an exterior surface of the mold body; and filling the chill cavity with a chill material, the chill material having a thermal conductivity that is greater than the thermal conductivity of the mold body.

In further accordance with any one or more of the foregoing exemplary aspects of the present invention, the method may further include, in any combination, any one or more of the following preferred forms.

In one preferred form, the mold body is produced by 3D sand printing.

In another preferred form, the chill material is one of metallic beads, zircon sand, chromite sand, ceramic beads, or olivine sand.

In another preferred form, the method includes the steps of: forming a second chill cavity adjacent the mold cavity and spaced apart from the chill cavity, the second chill cavity separated from the mold cavity by a second chill wall; forming a second fill channel in communication with the second chill cavity and with the exterior surface of the mold body; and filling the second chill cavity with a second chill material, the second chill material having a thermal conductivity that is greater than the thermal conductivity of the mold body.

In another preferred form, the second chill material is one of metallic beads, zircon sand, chromite sand, ceramic beads, or olivine sand.

In another preferred form, the second chill material is different than the chill material.

In another preferred form, the method includes the step of forming a vent channel having a first end in communication with the chill cavity and a second end in communication with an exterior surface of the mold to vent the chill cavity to the atmosphere.

In accordance with another exemplary aspect of the present invention, a mold kit includes a plurality of mold bodies and a chill material. At least one of the mold bodies includes a mold cavity, a chill cavity formed adjacent the mold cavity and separated from the mold cavity by a chill wall, and a fill channel in communication with the chill cavity and with an exterior surface of the mold body. The chill material is to be inserted into the chill cavity through the fill channel and has a thermal conductivity that is greater than the thermal conductivity of the mold body.

In further accordance with any one or more of the foregoing exemplary aspects of the present invention, the mold kit may further include, in any combination, any one or more of the following preferred forms.

In one preferred form, the mold bodies are one of sand mold bodies and 3D printed sand mold bodies.

In another preferred form, the at least one of the mold bodies includes a second chill cavity formed proximate the mold cavity and spaced apart from the chill cavity, the second chill cavity is separated from the mold cavity by a second chill wall, and a second fill channel in communication with the second chill cavity. The mold kit also includes a second chill material to be inserted into the second chill cavity through the second fill channel that has a thermal conductivity that is greater than the thermal conductivity of the mold body.

In another preferred form, the chill material is one of metallic beads, zircon sand, chromite sand, ceramic beads, or olivine sand and the second chill material is one of metallic beads, zircon sand, chromite sand, ceramic beads, or olivine sand.

In another preferred form, the second chill material is different than the chill material.

In another preferred form, the at least one of the mold bodies includes a vent channel having a first end in communication with the chill cavity and a second end in communication with an exterior surface of the mold body to vent the chill cavity to the atmosphere.

DETAILED DESCRIPTION

The examples described in the present disclosure provide the benefits of a traditional chill while eliminating the need to manufacture a near net shape chill to incorporate into a mold body, such as a 3D sand printed mold body. In the examples described herein, there is no longer any need to produce a near net shape chill via a machining operation and insert the chill into a cavity formed in the mold body. Rather, the molds, mold bodies, and methods described herein use a preformed pocket or chill cavity filled with a chill material such as metallic beads, ceramic beads, or specialty sands, that gives ideal thermal properties in the place of a typical chill. This allows the mold body design to 3D print the chill cavity and create a chill wall or barrier of sand between the casting surface and chill cavity. In addition, this minimizes the need for an inventory of chill blocks and could allow for a reduction in cost and personnel.

Figure 1:
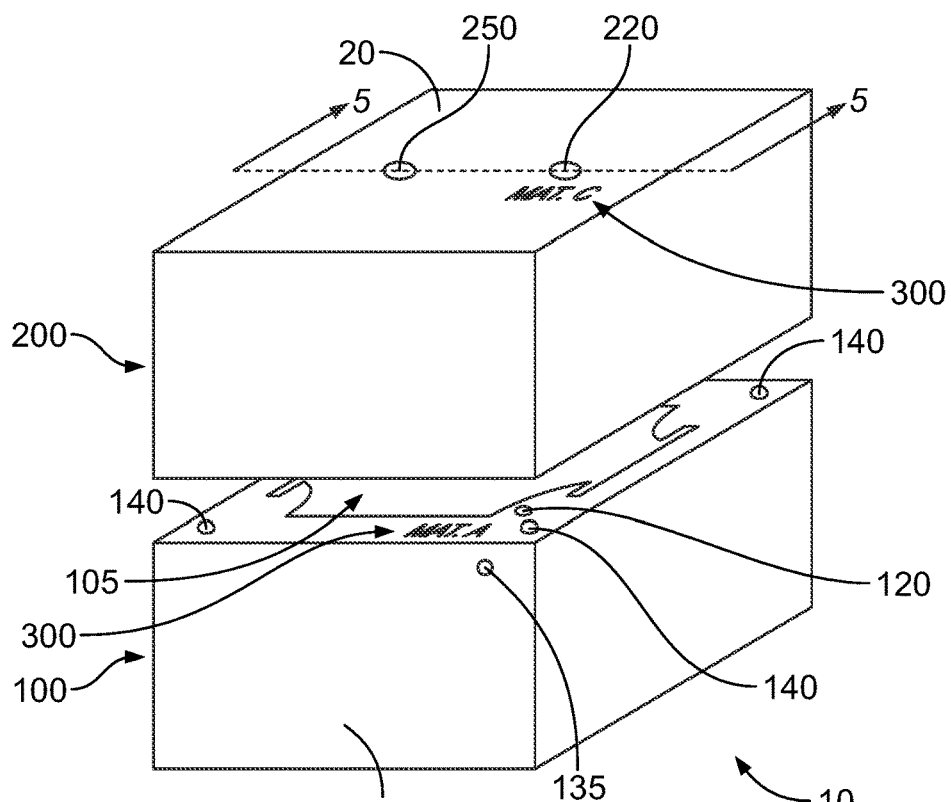
FIG. 1 is a perspective view of an example mold having multiple mold bodies with integral chill cavities.

Referring to FIG. 1, an example mold 10 has an exterior surface 20 encompassing the complete outer surface of mold 10 and includes first and second mold bodies 100, 200. Although mold 10 is shown as having two mold bodies for simplicity, it is understood that mold 10 can have any number of mold bodies as required for a particular casting application.

Figure 2:
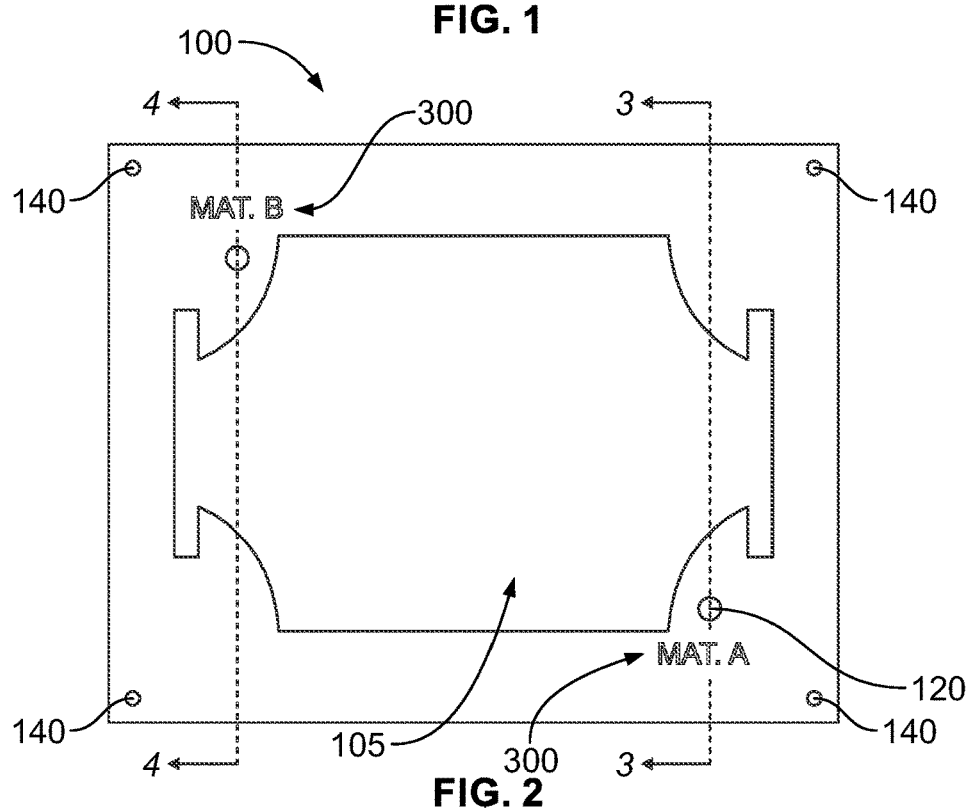
FIG. 2 is a top view of one of the mold bodies of FIG. 1.
Figure 3:
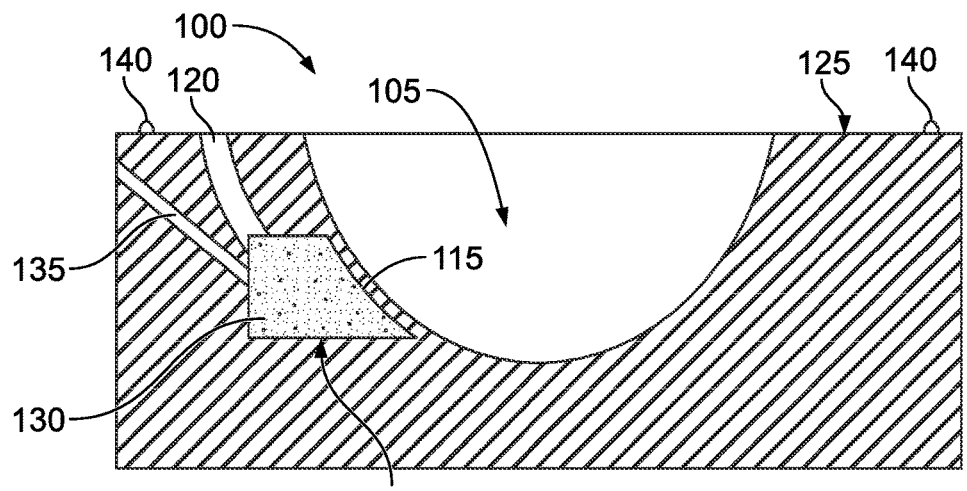
FIG. 3 is a cross-sectional view of the mold body of FIG. 2 taken along line A-A.
Figure 4:
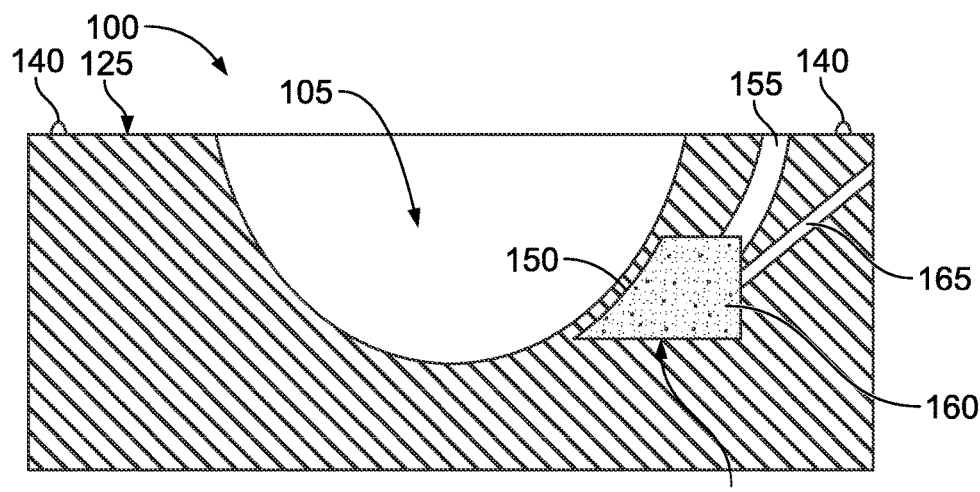
FIG. 4 is a cross-section view of the mold body of FIG. 2 taken along line B-B.

First mold body 100 can be manufactured using any desired manufacturing technique and can be a sand mold body or a 3D printed sand mold body, made by the 3D sand printing technique described above. As can be seen in FIGS. 2-4, first mold body 100 has a mold cavity 105 formed in first mold body 100 to produce at least a portion of the outer surface of a casting and can include protrusions 140, which can be received within recesses 240 in second mold body 200 to align first mold body 100 and second mold body 200 during the casting process. As best seen in FIG. 3, a chill cavity 110 is also formed in first mold body 100 adjacent mold cavity 105. Chill cavity 110 is separated from mold cavity 105 by chill wall 115, such that the area of chill wall 115 between chill cavity 110 and mold cavity 105 provides the area of the integrated chill. The thickness of chill wall 115 can be determined based on the particular design and application taking into account various factors, such as the thermal conductivity of the material used for first mold body 100, the thermal conductivity of the chill material 130, the casting material used, the desired chill effect, etc.

Chill material 130 is disposed in chill cavity 110 and, in order to provide a desired chill effect, chill material 130 has a thermal conductivity that is greater than the thermal conductivity of the material used for first mold body 100 to draw heat through chill wall 115 and cool the casting in the chill area. Chill material 130 acts as a heat sink to draw heat through chill wall 115 and into chill material 130, which will create a rapid cooling effect in a localized area similar to a common chill. Some examples of materials that could work for chill material 130 are metallic beads, such as ball bearings, zircon sand, chromite sand, ceramic beads, olivine sand, other specialty sands, or any other material that provides the desired thermal conductivity properties.

To provide a way to fill chill cavity 110 with chill material 130, a fill channel 120 can be formed in first mold body 100 that is in communication with chill cavity 110 and with an exterior surface 125 of first mold body 100. As discussed in more detail below, identifiers 300 can also be incorporated in first mold body 100 adjacent each respective fill channel 120 that can be used to identify the particular chill material 130 to be used in each chill cavity.

During the casting process, expanding gases produced in the chill cavities from increased temperatures may need to be vented. In the event a particular chill cavity cannot be vented through the fill channel, such as chill cavity 110, a vent channel 135 can be formed in first mold body 100 that has a first end in communication with chill cavity 110 and a second end in communication with exterior surface 20 of mold 10 to vent chill cavity 110 to the atmosphere.

As best seen in FIG. 4, if an additional chill area is desired in first mold body 100, a second chill cavity 145 can also formed in first mold body 100 adjacent mold cavity 105 and spaced apart from chill cavity 110. Second chill cavity 145 is separated from mold cavity 105 by second chill wall 150, such that the area of second chill wall 150 between second chill cavity 145 and mold cavity 105 provides a second integrated chill area. The thickness of second chill wall 150 can be determined based on the particular design and application taking into account various factors, such as the thermal conductivity of the material used for first mold body 100, the thermal conductivity of the second chill material 160, the casting material used, the desired chill effect, etc.

Second chill material 160 is disposed in second chill cavity 145 and, in order to provide a desired chill effect, second chill material 160 has a thermal conductivity that is greater than the thermal conductivity of the material used for first mold body 100 to draw heat through second chill wall 150 and cool the casting in the chill area. Second chill material 160 acts as a heat sink to draw heat through second chill wall 150 and into second chill material 160, which will create a rapid cooling effect in a localized area similar to a common chill. Some examples of materials that could work for second chill material 160 are metallic beads, such as ball bearings, zircon sand, chromite sand, ceramic beads, olivine sand, other specialty sands, or any other material that provides the desired thermal conductivity properties. While second chill material 160 may be the same as chill material 130, second chill material 160 could be different from chill material 130 to provide a different chill effect to the second integrated chill area defined by second chill wall 150 than that provided to the integrated chill area defined by chill wall 115.

To provide a way to fill second chill cavity 145 with second chill material 160, a second fill channel 155 can be formed in first mold body 100 that is in communication with second chill cavity 145 and with exterior surface 125 of first mold body 100.

In this particular example, since second chill cavity 145 cannot be vented through second fill channel 155, a second vent channel 165 can also be formed in first mold body 100 that has a first end in communication with second chill cavity 145 and a second end in communication with exterior surface 20 of mold 10 to vent second chill cavity 145 to the atmosphere.

Figure 5:
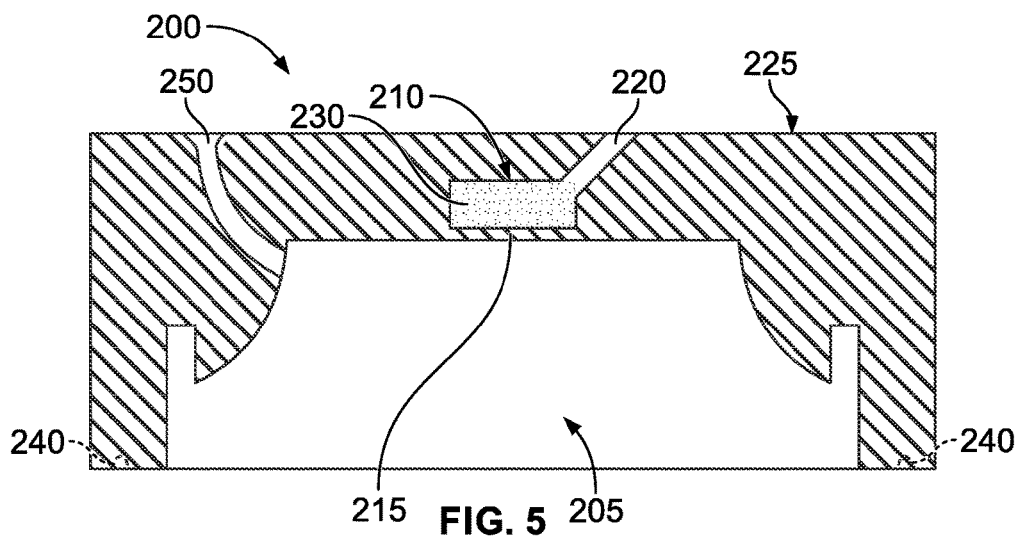
FIG. 5 is a cross-section view of the other mold body of FIG. 1, taken along line C-C.

Second mold body 200 can also be manufactured using any desired manufacturing technique and can be a sand mold body or a 3D printed sand mold body, made by the 3D sand printing technique described above. As shown in FIG. 5, second mold body 200 also has a mold cavity 205 formed in second mold body 200 to produce at least a portion of the outer surface of a casting and can include recesses 240, which can receive protrusions 140 in first mold body 100 to align first mold body 100 and second mold body 200 during the casting process. A chill cavity 210 is also formed in second mold body 200 adjacent mold cavity 205. Chill cavity 210 is separated from mold cavity 205 by chill wall 215, such that the area of chill wall 215 between chill cavity 210 and mold cavity 205 provides the area of the integrated chill. The thickness of chill wall 215 can be determined based on the particular design and application taking into account various factors, such as the thermal conductivity of the material used for second mold body 200, the thermal conductivity of the chill material 230, the casting material used, the desired chill effect, etc.

Chill material 230 is disposed in chill cavity 210 and, in order to provide a desired chill effect, chill material 230 has a thermal conductivity that is greater than the thermal conductivity of the material used for second mold body 200 to draw heat through chill wall 215 and cool the casting in the chill area. Chill material 230 acts as a heat sink to draw heat through chill wall 215 and into chill material 230, which will create a rapid cooling effect in a localized area similar to a common chill. Some examples of materials that could work for chill material 230 are metallic beads, such as ball bearings, zircon sand, chromite sand, ceramic beads, olivine sand, other specialty sands, or any other material that provides the desired thermal conductivity properties. While chill material 230 may be the same as chill material 130 and/or second chill material 160, chill material 230 could be different from chill material 130 and/or second chill material 160 to provide a different chill effect to the integrated chill area defined by chill wall 215.

To provide a way to fill chill cavity 210 with chill material 230, a fill channel 220 can be formed in second mold body 200 that is in communication with chill cavity 210 and with an exterior surface 225 of second mold body 200, which in the example shown is also part of exterior surface 20 of mold 10. As discussed in more detail below, identifiers 300 can also be incorporated in second mold body 200 adjacent fill channel 220 that can be used to identify the particular chill material 230 to be used in chill cavity 210. In the example shown, since fill channel 220 is in communication with exterior surface 20 of mold 10, fill channel 220 can be used to vent chill cavity 210 to the atmosphere and a separate vent channel is not required. Similarly, a sprue 250 can also be formed in second mold body 200 that is in communication with mold cavity 205 and with an exterior surface 225 of second mold body 200, which in the example shown is also part of exterior surface 20 of mold 10, to provide an opening in which molten material can be poured into mold 10 during the casting process.

Figure 6:
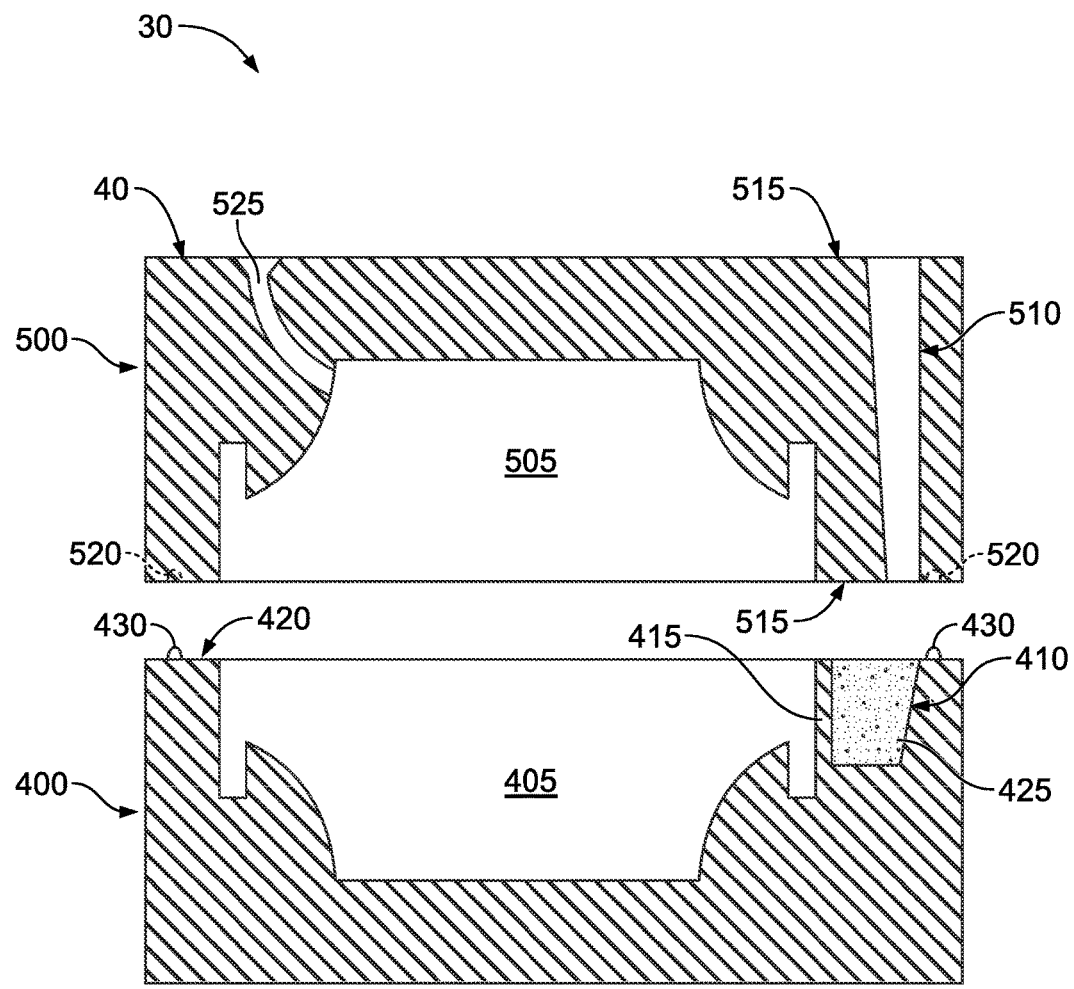
FIG. 6 is a cross-section view of another example mold having multiple mold bodies and an integral chill cavity.

FIG. 6 shows another an example mold 30 having an exterior surface 40 encompassing the complete outer surface of mold 30 and including first and second mold bodies 400, 500. Again, although mold 30 is shown as having two mold bodies for simplicity, it is understood that mold 30 can have any number of mold bodies as required for a particular casting application. In addition, mold 30 and mold bodies 400, 500 can be manufactured using any desired manufacturing technique and can be a sand mold body or a 3D printed sand mold body, made by the 3D sand printing technique described above. However, the example shown in FIG. 6 may be better suited for traditional sand mold manufacturing techniques.

As can be seen in FIG. 6, first mold body 400 has a mold cavity 405 formed in first mold body 400 to produce at least a portion of the outer surface of a casting and can include protrusions 430, which can be received within recesses 520 in second mold body 500 to align first mold body 400 and second mold body 500 during the casting process. A chill cavity 410 is also formed in first mold body 400 adjacent mold cavity 405 and is positioned near the parting line of mold 30 in communication with an exterior surface 420 of first mold body 400. Chill cavity 410 is separated from mold cavity 405 by chill wall 415, such that the area of chill wall 415 between chill cavity 410 and mold cavity 405 provides the area of the integrated chill. The thickness of chill wall 415 can be determined based on the particular design and application taking into account various factors, such as the thermal conductivity of the material used for first mold body 400, the thermal conductivity of the chill material 425, the casting material used, the desired chill effect, etc.

Chill material 425 is disposed in chill cavity 410 and, in order to provide a desired chill effect, chill material 425 has a thermal conductivity that is greater than the thermal conductivity of the material used for first mold body 400 to draw heat through chill wall 415 and cool the casting in the chill area. Chill material 425 acts as a heat sink to draw heat through chill wall 415 and into chill material 425, which will create a rapid cooling effect in a localized area similar to a common chill. Some examples of materials that could work for chill material 425 are metallic beads, such as ball bearings, zircon sand, chromite sand, ceramic beads, olivine sand, other specialty sands, or any other material that provides the desired thermal conductivity properties.

Second mold body 500 also has a mold cavity 505 formed in second mold body 500 to produce at least a portion of the outer surface of a casting and can include recesses 520, which can receive protrusions 430 in first mold body 400 to align first mold body 400 and second mold body 500 during the casting process.

To provide a way to fill chill cavity 410 in first mold body 400, a fill channel 510 can be formed in second mold body 500 that is in communication with chill cavity 410 when mold 30 is closed and with an exterior surface 515 of second mold body 500, which in the example shown is also part of exterior surface 40 of mold 30. Fill channel 510 can also be tapered to allow the mold to draw off. In the example shown, since fill channel 510 is in communication with exterior surface 40 of mold 30, fill channel 510 can be used to vent chill cavity 410 to the atmosphere and a separate vent channel is not required. Similarly, a sprue 525 can also be formed in second mold body 500 that is in communication with mold cavity 505 and with exterior surface 515 of second mold body 500, to provide an opening in which molten material can be poured into mold 30 during the casting process. As discussed in more detail below, identifiers can also be incorporated in second mold body 500 adjacent fill channel 510 that can be used to identify the particular chill material 425 to be used in chill cavity 410.

Molds using the above described integrated chills can also be provided as mold kits. For example, a mold kit could be provided that contained first and second mold bodies 100, 200 described above and various packages of chill material, such as chill materials 130, 160, 230 described above, to fill chill cavities 110, 145, 210 through fill channels 120, 155, 220. First and second mold bodies 100, 200 can include identifiers 300 adjacent fill channels 120, 155, 220 to identify which chill material 130, 160, 230 goes into which fill channel 120, 155, 220 and the mold kit could include instructions as to which chill material to be used and how much to fill each chill cavity. Identifiers 300 could be any recognizable text or symbol and could be incorporated into or onto first and second mold bodies 100, 200 in a variety of ways, such as forming or etching identifiers 300 directly into the mold bodies, printing identifiers 300 directly on the mold bodies, printing identifiers 300 on labels that are adhered to the mold bodies, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A mold body for use in a mold, comprising:
   a mold cavity;
   a chill cavity formed adjacent the mold cavity and separated from the mold cavity by a chill wall;
   a fill channel in communication with the chill cavity and with an exterior surface of the mold body; and
   a chill material disposed within the chill cavity, the chill material being one of metallic beads, zircon sand, chromite sand, ceramic beads, or olivine sand and having a thermal conductivity that is greater than the thermal conductivity of the mold body.

2. The mold body of claim 1, wherein the mold body is one of a sand mold body and a 3D printed sand mold body.

3. The mold body of claim 1, further comprising:
   a second chill cavity formed adjacent the mold cavity and spaced apart from the chill cavity, the second chill cavity separated from the mold cavity by a second chill wall;
   a second fill channel in communication with the second chill cavity and with the exterior surface of the mold body; and
   a second chill material disposed within the second chill cavity, the second chill material having a thermal conductivity that is greater than the thermal conductivity of the mold body.

4. The mold body of claim 3, wherein the second chill material is one of metallic beads, zircon sand, chromite sand, ceramic beads, or olivine sand.

5. The mold body of claim 3, wherein the second chill material is different than the chill material.

6. The mold body of claim 1, further comprising a vent channel having a first end in communication with the chill cavity and a second end in communication with an exterior surface of the mold to vent the chill cavity to atmosphere.

7. A method of producing a mold body for use in a mold, comprising the steps of:
   forming a mold cavity;
   forming a chill cavity adjacent the mold cavity and separated from the mold cavity by a chill wall;
   forming a fill channel in communication with the chill cavity and with an exterior surface of the mold body; and
   filling the chill cavity with a chill material, the chill material being one of metallic beads, zircon sand, chromite sand, ceramic beads, or olivine sand and having a thermal conductivity that is greater than the thermal conductivity of the mold body.

8. The method of claim 7, wherein the mold body is produced by 3D sand printing.

9. The method of claim 7, further comprising the steps of:
   forming a second chill cavity adjacent the mold cavity and spaced apart from the chill cavity, the second chill cavity separated from the mold cavity by a second chill wall;
   forming a second fill channel in communication with the second chill cavity and with the exterior surface of the mold body; and
   filling the second chill cavity with a second chill material, the second chill material having a thermal conductivity that is greater than the thermal conductivity of the mold body.

10. The method of claim 9, wherein the second chill material is one of metallic beads, zircon sand, chromite sand, ceramic beads, or olivine sand.

11. The method of claim 9, wherein the second chill material is different than the chill material.

12. The method of claim 7, further comprising the step of forming a vent channel having a first end in communication with the chill cavity and a second end in communication with an exterior surface of the mold to vent the chill cavity to atmosphere.

13. A mold kit, comprising:
    a plurality of mold bodies, at least one of the mold bodies comprising:
    a mold cavity;
    a chill cavity formed adjacent the mold cavity and separated from the mold cavity by a chill wall; and a fill channel in communication with the chill cavity and with an exterior surface of the mold body; and a chill material to be inserted into the chill cavity through the fill channel, the chill material being one of metallic beads, zircon sand, chromite sand, ceramic beads, or olivine sand and having a thermal conductivity that is greater than the thermal conductivity of the mold body.

14. The mold kit of claim 13, wherein the mold bodies are one of sand mold bodies and 3D printed sand mold bodies.

15. The mold kit of claim 13, wherein:

the at least one of the mold bodies further comprises: a second chill cavity formed proximate the mold cavity and spaced apart from the chill cavity, the second chill cavity separated from the mold cavity by a second chill wall; and a second fill channel in communication with the second chill cavity; and the mold kit further comprises: a second chill material to be inserted into the second chill cavity through the second fill channel, the second chill material having a thermal conductivity that is greater than the thermal conductivity of the mold body.

16. The mold kit of claim 15, wherein:

the second chill material is one of metallic beads, zircon sand, chromite sand, ceramic beads, or olivine sand.

17. The mold kit of claim 15, wherein the second chill material is different than the chill material.

18. The mold kit of claim 13, wherein the at least one of the mold bodies further comprises a vent channel having a first end in communication with the chill cavity and a second end in communication with an exterior surface of the mold body to vent the chill cavity to atmosphere.

* * * * *

UNITED STATES PATENT AND TRADEMARK OFFICE
CERTIFICATE OF CORRECTION

PATENT NO. : 10,391,551 B2  
APPLICATION NO. : 15/425055  
DATED : August 27, 2019  
INVENTOR(S) : Adam Taylor Boyle et al.

Page 1 of 1

It is certified that error appears in the above-identified patent and that said Letters Patent is hereby corrected as shown below:

In the Specification

At Column 1, Line 33, "is the applied" should be -- is then applied --.

At Column 3, Line 47, "cross-section" should be -- cross-sectional --.

At Column 3, Line 49, "cross-section" should be -- cross-sectional --.

At Column 3, Line 51, "cross-section" should be -- cross-sectional --.

At Column 4, Lines 62-63, "can also formed" should be -- can also be formed --.

At Column 6, Line 29, "another an example mold" should be -- another example mold --.

Signed and Sealed this  
Sixth Day of October, 2020

Andrei Iancu  
*Director of the United States Patent and Trademark Office*